(12) United States Patent
Steinhart et al.

(10) Patent No.: US 6,516,662 B2
(45) Date of Patent: Feb. 11, 2003

(54) VOLUME METER FOR MEASURING THE VOLUME OF CUPS IN A PRINTING DEVICE

(75) Inventors: Bernard J. M. E. Steinhart, Hapert (NL); Leonardus W. M. Koppes, Helmond (NL)

(73) Assignee: Steinhart B.V., Helmond (NL)

( * ) Notice: Subject to any disclaimer, the term of this patent is extended or adjusted under 35 U.S.C. 154(b) by 0 days.

(21) Appl. No.: 09/800,077

(22) Filed: Mar. 6, 2001

(65) Prior Publication Data

US 2001/0032501 A1 Oct. 25, 2001

(30) Foreign Application Priority Data

Mar. 7, 2000 (NL) ............................................. 1014572

(51) Int. Cl.⁷ .............................................. G01F 17/00
(52) U.S. Cl. ....................................................... 73/149
(58) Field of Search .................................. 73/105, 149

(56) References Cited

U.S. PATENT DOCUMENTS

| | | | |
|---|---|---|---|
| 5,235,851 A | 8/1993 | Jones | ........................... 73/149 |
| 6,239,228 B1 * | 5/2001 | Zajaczkowski et al. | |
| 6,294,243 B1 * | 9/2001 | Nakamura | |

* cited by examiner

Primary Examiner—Robert Raevis
(74) Attorney, Agent, or Firm—Neal M. Cohen

(57) ABSTRACT

A volume meter 1 for measuring the volume of cups in a printing device has a reservoir formed by an indentation 5 in a foil 3. In the reservoir there is a viscous substance 11 comprising grease mixed with a colorant. The volume meter 1 has an adhesive 17 for fastening to a screen. The foil is free over an area 18 of the adhesive 17. This area 18 is larger than the spot that the viscous substance 11 covers after the spreading in the cups with the help of a doctor blade. The size of this spot is a measure for the volume of the cups and can be read with the aid of a scale division present on the foil 3. The indentation 5 in the foil 3 has such a form that the foil 3 does not fold double if a doctor blade is passed along the indentation 5, and the foil 3 at the place of the indentation 5 is pushed against the screen with the doctor blade in order to push the viscous substance 11 out of the reservoir.

12 Claims, 2 Drawing Sheets

VOLUME METER FOR MEASURING THE VOLUME OF CUPS IN A PRINTING DEVICE

PRIORITY CLAIM

This application claims priority under 35 U.S.C. §119, to the previously-filed Dutch (Netherlands) application number NL 1014572, filed Mar. 7, 2000. The aforementioned Dutch application is hereby incorporated herein by reference in its entirety.

BACKGROUND OF THE INVENTION

1. Field of the Invention

The invention relates to a volume meter, specifically for the measuring of the volume of cups in a printing device, comprising a foil, fastening agents for temporary fastening of the foil on a screen, a reservoir that is connected during operation with a space between the foil and a screen, and a viscous substance present in the reservoir.

Here a printing device is understood to mean a device for applying for example ink, a coating, glue for example on paper, or any other desired base. A printing device often has a screen roller. The cups are located in the casing of the roller. A screen roller is engraved by means of a moulette on a steel roller or by means of a laser if the roller is coated with a ceramic coating. There are also other printing devices, for example those in which the printing process takes place with the aid of a flat die. Here the cups are in the printing surface of the die. The volume of the cups is important to the printing process, amongst other reasons to determine how much printing ink can be fed during the printing process.

Foil is understood to mean any substrate that is thin and flexible, irrespective of what material it consists of, whether this is for example plastic or paper. The specified space between the foil and the screen roller is only present during the spreading of the viscous material. Before this and after the viscous substance is spread in the cups the foil is preferably against the screen.

2. Prior Art

A volume meter for measuring the volume of cups in a printing device is known from American patent U.S. Pat. No. 5,235,851. The known volume meter comprises a foil, which on its underside has an adhesive layer, which has two adhesive strips between which a channel is formed. This adhesive layer serves to bring the foil on a screen to be measured. In the reservoir there is a liquid and in order to keep this liquid in the reservoir the reservoir is closed off by another foil, which is fastened to the foil along a closed connection zone around the indentation.

In this known volume meter the measurement takes place by placing the foil on the screen and then passing a doctor blade along the foil, so that the liquid in the reservoir is pressed against a weakening in the connection zone and the weakening is broken through. Then the doctor blade is passed along the foil, at which time the liquid is forced into the channel. The liquid is spread in the cups, with the length of the surface of the liquid-filled cups being a measure for the volume of the cups.

A disadvantage of this known volume meter is that the accuracy of the measurement leaves something to be desired.

SUMMARY OF THE INVENTION

An objective of the invention is to provide a volume meter of the type described in the preamble with which a higher accuracy can be achieved in the measurement of the volume than with the known volume meter. To this end, the volume meter according to the invention is characterised in that the foil is free of the fastening agents over an area, which area is larger than a spot that the viscous substance covers after the spreading of the viscous substance from the reservoir, between the foil and the screen to be measured, in the cups.

It has been noted that in the known volume meter the liquid in the reservoir during scraping sometimes comes under the glue layer of the limitations of the channel. By only pressing the foil outside the efflux opening in the reservoir against the screen or keeping it stretched, the viscous substance can go in all directions unhindered and the viscous substance is not forced through a channel determined in advance. So the viscous substance can also not go undesired under the adhesive outside a channel. It has been noted that during scraping the viscous substance always shows the same pattern on the screen (the form is roughly that of a pinecone). For determining the surface of the pattern it is therefore sufficient to measure the length of the pattern.

An embodiment of the volume meter according to the invention is characterised in that the reservoir is formed by an indentation in the foil. Preferably, the indentation has such a form that the foil does not fold double, if the foil is applied to a screen and a doctor blade is passed along the indentation in order to bring the viscous substance out of the reservoir, so that the foil at the location of the indentation is pressed by the doctor blade against the screen.

In the known volume meter the indentation has such a form that during the passing of the doctor blade along the indentation the foil folds double. However, it has been noted that by the double folding viscous substance always stays behind in the reservoir, which remains enclosed in the double folded portion of the foil. By a suitable form of the indentation, which can easily be experimentally found, for example a rather flat indentation, the foil does not fold double. The suitable form of the indentation depends partly on the stiffness and the thickness of the foil used.

It is noted that this latter embodiment, in which the indentation has such a form that during scraping the foil cannot be folded double, can also be used without the characteristic that the foil over a sufficient area is free of the fastening agents. For example, this form of indentation, for example used with the known volume meter, also results in an improvement of accuracy since little or no viscous substance remains behind in the reservoir during scraping. For this reason the possibility is specifically kept open of claiming this characteristic (form of indentation) independently of the main characteristic (area free of fastening agents).

To prevent the viscous substance from coming undesired out of the reservoir during use, a further embodiment of the volume meter is characterised in that the volume meter also comprises a further foil, which is present on a portion of the foil and covers the indentation.

When the viscous substance is spread out of the reservoir with the known volume meter, first a connection zone must be broken through by pressing the viscous substance against a weakening in the connection zone. To simplify the pressing of the viscous substance out of the reservoir, another embodiment of the volume meter is characterised in that the further foil is fastened to the foil with an adhesive, with the adhesive partly being present around the indentation and a strip between an edge of the) further foil and the indentation being free of adhesive. The viscous substance can be pushed via this strip out of the reservoir without pressure needing to be built up in the viscous substance.

The fastening agents with which the volume meter can be placed on a screen preferably comprise another adhesive, which is present on a portion of the foil and at least on a portion of the further foil. Preferably, the further foil at the location of the reservoir has the further adhesive. For this the reservoir is well fixed on the screen and the viscous substance can be spread out of the reservoir well.

To improve how the volume meter can be handled, yet another embodiment is characterised in that the volume meter also comprises a removable cover foil, which covers the further adhesive present on the foil and the further foil.

The standards that the viscous substance in the reservoir must fulfil are: it must be well doseable, it must not evaporate too much to be able to guarantee a long storage time between manufacture and use, it must be able to be properly placed in the cups, and it must be visible.

An embodiment of the volume meter that fulfils these standards is characterised in that the viscous substance comprises grease and/or oil. Preferably, the main ingredient of the viscous substance is grease.

To improve its visibility on a screen the viscous substance preferably comprises a colorant. The composition of the viscous substance is preferably approximately 1 weight per cent colorant and approximately 99 weight per cent grease. However, a composition of approximately 0.5 weight per cent colorant, approximately 10 weight per cent oil and approximately 89.5 weight per cent grease is also good.

The oil is preferably mineral motor oil for petrol and LPG motors for all seasons, preferably 15W–40 oil. The grease is preferably Keenol grease, and the colorant is preferably Waxoline.

In the above described characteristics and embodiments of the invention the word screen is understood to mean not only a screen of cups of a printing device, but also other screens, for example a surface of which the roughness should be determined with the aid of the volume meter according to the invention. In that case cups is understood to mean the valleys in the roughness profile of the surface.

BRIEF DESCRIPTION OF THE DRAWINGS

The invention will be elucidated more fully below on the basis of drawings in which an embodiment of the volume meter according to the invention is shown. In these drawings.

DETAILED DESCRIPTION

Figure 1:
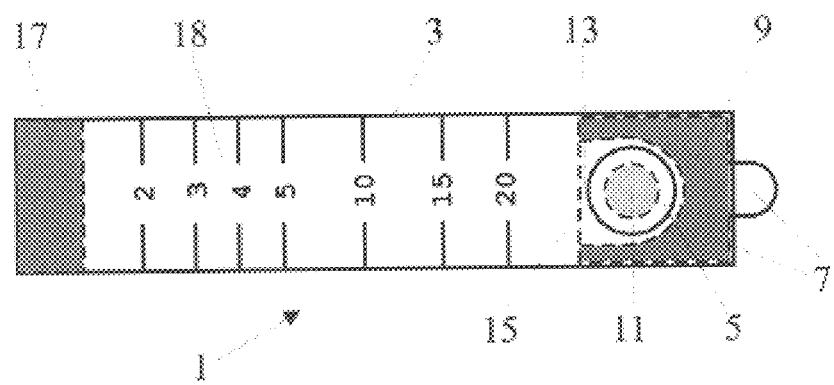
FIG. 1 is a top view of an embodiment of the volume meter according to the invention.
Figure 2:
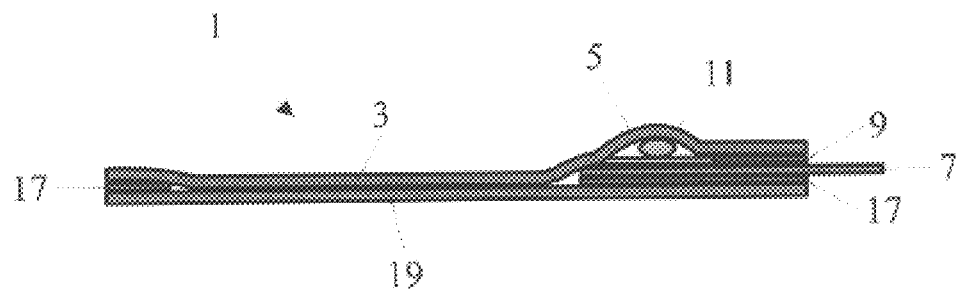
FIG. 2 is a cross-section of the volume meter.

In FIGS. 1 and 2 an embodiment of the volume meter according to the invention is shown in respectively a top view and a cross-section. The volume meter 1 has a foil 3, which is provided with an indentation 5, which forms a reservoir. The indentation 5 is covered by a further foil 7, which is fastened with an adhesive 9 to the foil 3. In the indentation 5 there is a viscous substance 11 present. The further foil 7 is provided with a lip, which sticks out under the foil 3, in order to pull off the volume meter 1 from the screen after measurement. The adhesive 9 is partially present around the indentation 5. A strip 13 between the edge 15 of the further foil 7 and the indentation 5 is free of the adhesive 9 in order to lead the viscous substance to the screen.

The volume meter I has fastening agents for temporary fastening of the foil 3 on a screen. The fastening agents are formed by a further adhesive 17, which is on an end of the foil 3 on the bottom of it and on the underside of the further foil 7. Between these zones with adhesive 17 there is an area 18 (the non-shaded square part of the foil 3 in FIG. 1) that is free of fastening agents (adhesives) and during use lies against a surface of a screen to be measured. The volume meter 1 is also provided with a removable cover foil 19, which covers the further adhesive 17 that is on the foil 3 and the further foil 7. Before the use of the volume meter 1 this cover foil 19 must be removed, after which the volume meter 1 can be stuck on a screen.

Figure 3:
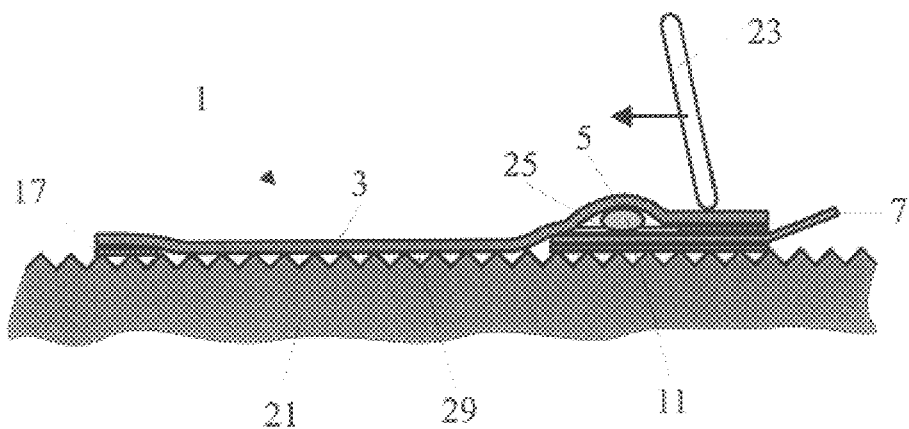
FIGS. 3, 4 and 5 are cross-sections of the volume meter present on a screen during various phases of a measurement.
Figure 4:
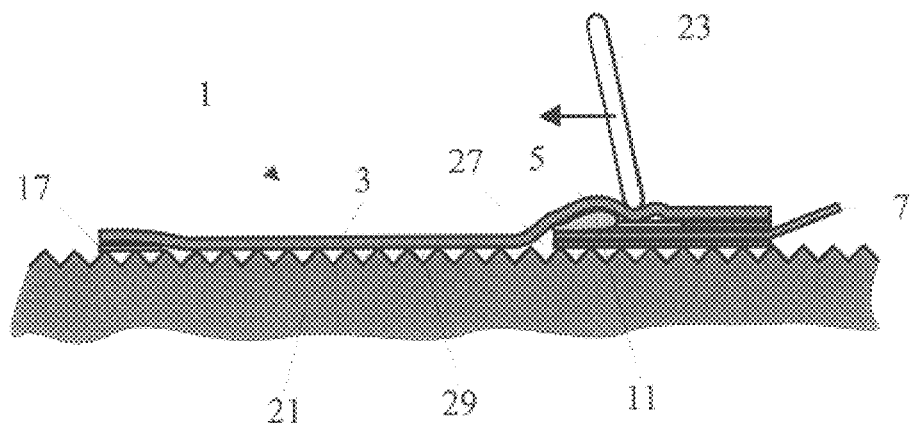
Figure 5:
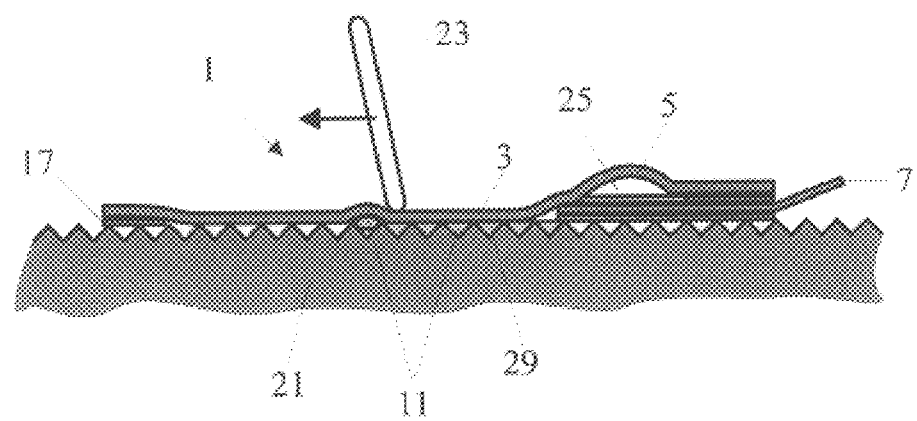

On the basis of the FIGS. 3, 4, and 5 the measurement of the volume of cups will be clarified. These Figures show a cross-section of the volume meter 1 present on a screen 21 of a printing device during various phases of a measurement.

Once the volume meter 1 has been stuck to the screen 21, a doctor blade 23 is passed along the volume meter 1, see FIG. 3. Here the foil 3 at the site of the indentation 5 is pressed against the further foil 7, without the foil 3 here folding double, see FIG. 2. This is possible due to a suitable form or curvature of the indentation 5, which form or curvature can be easily determined by testing and depends on the material and the thickness of the foil 3. It has been noted that the material Vikunyl (PVC) from the company Vink of Didam, Netherlands, preferably with a thickness of 140 micrometers, is a good material for the foil 3.

During scraping the viscous substance 11 in the reservoir 25 comes into a space 27 between the foil 3 and the screen 21, see FIG. 4. During the further moving of the doctor blade 23 the viscous substance 11 is spread in the cups 29, see FIG. 5. The viscous substance 11 is comprised of grease and a colorant, in a composition of 1 weight per cent colorant and 90 weight per cent grease. The grease is, in this embodiment, Keenol grease, which is available from the company Duckhams Grease, and the colorant is Waxoline. The volume of the viscous substance 11 is preferably 3 microliters.

Figure 6:
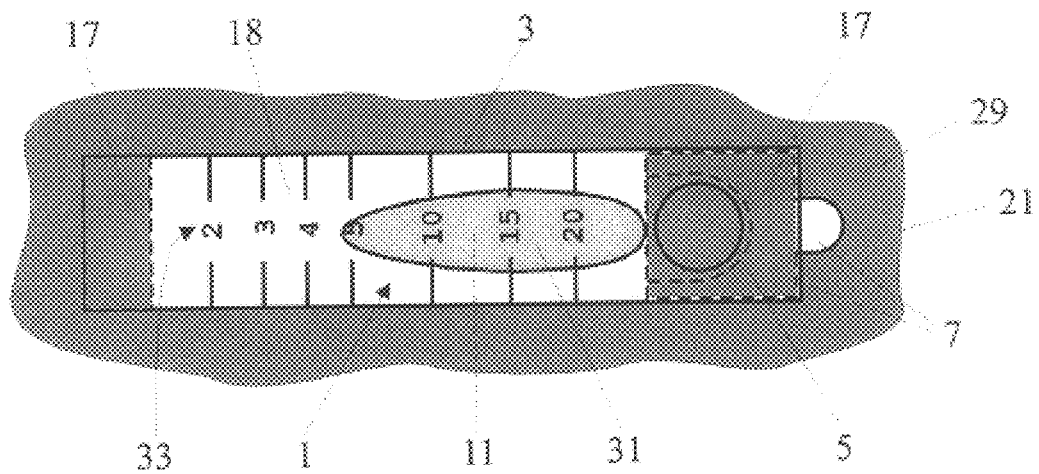
FIG. 6 is a top view of the volume meter on the screen after the measurement is carried out.

In FIG. 6 a top view of the volume meter 1 on the screen 21 is shown after the spreading of the viscous substance 11 in the cups 29. On the screen 21 a spot 31 has been formed. Over the area 18 the foil 3 is free of the further adhesive 17. This area 18 is larger than the spot 31 that the viscous substance 11 covers after spreading. The size of this spot 31 forms a measure for the volume of the cups 29. Because this spot 31 at various measurements is always virtually the same form, the length of this spot 31 is a measure for the volume of the cups 29. On the foil 3 there is a calibrated scale division 33 with which the size of the volume of the cups 29 can be directly read.

Although in the above the invention is explained on the basis of the drawings, it should be noted that the invention is in no way limited to the embodiment shown in the drawings. The invention also extends to all embodiments deviating from the embodiment shown in the drawings within the context defined by the claims.

For example, the further adhesive can also be present along the length sides of the foil in strips, with the area of the foil that is free of fastening agents/adhesives then being located between these strips and the zones on an end of the foil and on the further foil. Here this area must be larger than the spot that the viscous substance forms on a screen after spreading, so that the viscous substance does not touch the adhesive. For example, the further foil can also have the further adhesive only near the reservoir, with the other end of the foil being free of the further adhesive and during operation lying loose on a screen. During scraping the foil is then pressed against the screen, where the foil fulfils its task of guiding the viscous substance and for reading off the size of the volume of the cups.

In addition, another viscous substance can be used. Instead of the Keenol grease mentioned in the example every suitable paste-like substance can be used. A viscous substance can also be used that is comprised only or mainly of oil and colorant.

In addition, the volume meter can be used for other applications than measuring the volume of cups in a printing device. The volume meter can, for example, also be used for measuring the roughness of surfaces. Instead of cups then the valleys in the roughness profile of a surface function as spaces that are filled by liquid. The measurement here is done in the same manner as described above. By the generally smaller volumes of these spaces the volume meter should preferably be adapted, for example by a smaller quantity of viscous substance in the reservoir and an adapted calibration with roughness values along the scale division. This roughness measurement should also be viewed in the context of the present invention as a volume measurement.

What is claimed is:

1. A volume meter for measuring the of cup in a printing device comprising:
    a foil;
    fastening agents for temporary fastening of the foil on a screen;
    a reservoir connected during operation with a space between the foil and the screen; and
    a viscous substance present in the reservoir;
    characterised in that an area of the foil is free of the fastening agents, said area being larger than a spot the viscous substance covers after spreading of the viscous substance from the reservoir, between the foil and the screen to be measured, in the cups;
    wherein the reservoir is formed by an indentation in the foil; and
    wherein the indentation has such a form that the foil does not fold double if the foil is placed on the screen and a doctor blade is passed along the indentation in order to push the viscous substance out of the reservoir, with the foil at the location of the indentation being pushed by the doctor blade against the screen.

2. A volume meter for measuring the volume of cups in printing device comprising:
    a foil;
    fastening agents for temporary fastening of the foil on a screen;
    a reservoir connected during operation with a space between the foil and the screen; and
    a viscous substance present in the reservoir;
    characterised in that an area of the foil is free of the fastening agents, said area being larger than a spot the viscous substance covers after spreading of the viscous substance from the reservoir, between the foil and the screen to be measured, in the cups;
    wherein the reservoir is formed by an indentation in the foil;
    wherein the volume meter also comprises a further foil, which is present on a portion of the foil and covers the indentation; and
    wherein the further foil is fastened with an adhesive to the foil, with the adhesive partly being present around the indentation and a strip between an edge of the further foil and the indentation being free of adhesive.

3. The volume meter according to claim 2, characterised in that the fastening agents comprise a further adhesive, which is present on a portion of the foil and at least a portion of the further foil.

4. The volume meter according to claim 3, characterised in that the volume meter also comprises a removable cover foil, which covers the further adhesive present on the foil and the further foil.

5. A volume meter for measuring the volume of cups in printing device comprising:
    a foil;
    fastening agents for temporary fastening of the foil on a screen;
    a reservoir connected during operation with a space between the foil and the screen; and
    a viscous substance present in the reservoir;
    characterised in that an area of the foil is free of the fastening agents, said area being larger than a spot the viscous substance covers after spreading of the viscous substance from the reservoir, between the foil and the screen to be measured, in the cups; and
    wherein the viscous substance comprises grease.

6. The volume meter according to claim 5, characterised in that the viscous substance comprises a colorant.

7. The volume meter according to claim 6, characterised in that the composition of the viscous substance is approximately 0.5 weight per cent colorant, approximately 10 weight per cent oil and approximately 89.5 weight per cent grease.

8. The volume meter according to claim 6, characterised in that the composition of the viscous substance is approximately 1 weight per cent colorant and approximately 99 weight per cent grease.

9. A volume meter for measuring the volume of cups on a surface comprising:
    a foil having an indentation therein;
    a viscous substance in the indentation;
    a further foil below the foil and fastened thereto with an adhesive, leaving a strip free of adhesive between an edge of the further foil and the indentation; and
    a cover foil removably attached to the and to the further foil by a further adhesive at an end of the foil and at an underside of the further foil respectively, leaving an area between the end of the foil and the underside of the further foil free of the further adhesive, said area being larger than a spot the viscous substance covers after spreading of the viscous substance from a reservoir within the indentation;
    wherein the indentation is shaped such that the foil does not fold double if the foil is placed on the surface and the indentation is pushed against the surface to force the viscous substance out of the indentation.

10. A volume meter for measuring the volume of cups on a surface comprising:
    a foil having an indentation therein;
    a viscous substance in the indentation;
    a further foil below the foil and fastened thereto with an adhesive, leaving a strip free of adhesive between an edge of the further foil and the indentation; and a cover foil removably attached to the and to the further foil by a further adhesive at an end of the foil and at an underside of the further foil respectively, leaving an area between the end of the foil and the underside of the further foil free of the further adhesive, said area being larger than a spot the viscous substance covers after spreading of the viscous substance from a reservoir within the indentation;

wherein the viscous substance comprises grease.

11. A method of measuring the volume of cups on a surface comprising the steps:

providing a volume meter comprising a foil having an indentation therein, a further foil below the foil and fastened thereto with an adhesive, leaving a strip free of adhesive between an edge of the further foil and the indentation, a cover foil removably attached to the foil and to the further foil by a further adhesive at an end of the foil and at an underside of the further foil respectively, leaving an area between the end of the foil and the underside of the further foil free of the further adhesive; and a viscous substance in the indentation; wherein said area is larger than a spot the viscous substance covers after spreading of the viscous substance from a reservoir within the indentation;

removing the cover foil from the volume meter;

placing the volume meter on a surface after removing the cover foil;

pressing the foil against the further foil at the indentation to cause the viscous substance to pass into cups on the surface; and determining the volume of the cups based upon the size of the spot;

wherein the foil is not folded double during the pressing thereof against the further foil.

12. A method of measuring the volume of cups on a surface comprising the steps:

providing a volume meter comprising a foil having an indentation therein, a further foil below the foil and fastened thereto with an adhesive, leaving a strip free of adhesive between an edge of the further foil and the indentation, a cover foil removably attached to the foil and to the further foil by a further adhesive at an end of the foil and at an underside of the further foil respectively, leaving an area between the end of the foil and the underside of the further foil free of the further adhesive; and a viscous substance in the indentation; wherein said area is larger than a spot the viscous substance covers after spreading of the viscous substance from a reservoir within the indentation;

removing the cover foil from the volume meter;

placing the volume meter on a surface after removing the cover foil;

pressing the foil against the further foil at the indentation to cause the viscous substance to pass into cups on the surface; and determining the volume of the cups based upon the size of the spot;

wherein the viscous substance comprises grease.

* * * * *